United States Patent
Ejzak et al.

(10) Patent No.: US 8,139,541 B2
(45) Date of Patent: Mar. 20, 2012

(54) METHOD AND SYSTEM FOR BYPASSING MEDIA GATEWAYS IN WIRELESS NETWORKS

(75) Inventors: Richard P. Ejzak, Wheaton, IL (US); James A. Calme, Aurora, IL (US); John M. Gafrick, Naperville, IL (US)

(73) Assignee: Alcatel Lucent, Paris (FR)

( * ) Notice: Subject to any disclaimer, the term of this patent is extended or adjusted under 35 U.S.C. 154(b) by 945 days.

(21) Appl. No.: 11/639,938

(22) Filed: Dec. 15, 2006

(65) Prior Publication Data

US 2008/0146208 A1 Jun. 19, 2008

(51) Int. Cl.
*H04W 4/00* (2009.01)

(52) U.S. Cl. ........ 370/331; 370/352; 370/342; 370/401; 370/360; 455/560

(58) Field of Classification Search ............... 370/360, 370/342, 401, 352, 331; 455/560
See application file for complete search history.

(56) References Cited

U.S. PATENT DOCUMENTS

| | | | | |
|---|---|---|---|---|
| 7,359,390 | B2 * | 4/2008 | Belling et al. | 370/401 |
| 2003/0027595 | A1 * | 2/2003 | Ejzak | 455/560 |
| 2004/0082366 | A1 * | 4/2004 | Longoni et al. | 455/561 |
| 2004/0107235 | A1 * | 6/2004 | Koskelainen | 709/200 |
| 2004/0203640 | A1 | 10/2004 | Molander et al. | |
| 2004/0235477 | A1 * | 11/2004 | Picha et al. | 455/439 |
| 2005/0043017 | A1 * | 2/2005 | Esposito et al. | 455/414.1 |
| 2005/0201336 | A1 * | 9/2005 | Lee | 370/335 |
| 2006/0099951 | A1 * | 5/2006 | Park | 455/439 |
| 2006/0114868 | A1 * | 6/2006 | Park | 370/338 |
| 2007/0053343 | A1 * | 3/2007 | Suotula et al. | 370/352 |
| 2007/0058609 | A1 * | 3/2007 | Goel et al. | 370/352 |
| 2008/0057943 | A1 * | 3/2008 | Shen et al. | 455/425 |
| 2009/0070484 | A1 * | 3/2009 | Ewert et al. | 709/236 |

OTHER PUBLICATIONS

Bale, M.C., Voice and Internet Multimedia in UMTS Networks, BT Technol Journal, vol. 19, No. 1 Jan. 2001.
Perez-Costa, Xavier, et al., Optimal Radio Access Bearer Configuration for Voice over IP in 3G UMTS Networks, NEC Network Laboratories, Heidelberg, Germany, p. 1-6.
Schefczik, Peter, et al., Comparison of UMTS and Beyond Architecture Evolution Scenarios, Lucent Technologies, Nuremberg, Germany, Bell Labs Advanced Technologies, P78/1-78/10.

* cited by examiner

*Primary Examiner* — Pierre-Louis Desir
(74) *Attorney, Agent, or Firm* — Fay Sharpe LLP

(57) ABSTRACT

A call processing method and system in which the use of the MGW between the RNC and the peer party is limited to only certain situations. This invention uses RFC 3267 (AMR/IETF) on the RNC. This will avoid inserting a MGW context for framing conversion only. This invention provides an optimization that sets up calls from the RNC, thus avoiding the need for a MGW in the path for basic calls. With this optimization, the usage of DSP and packet resources and the number of MGW chassis, as well as bearer path delay, are all reduced.

22 Claims, 6 Drawing Sheets

METHOD AND SYSTEM FOR BYPASSING MEDIA GATEWAYS IN WIRELESS NETWORKS

BACKGROUND OF THE INVENTION

This invention relates to a method and system for bypassing Media Gateways in wireless networks. While the invention is particularly directed to the art of telecommunications, and will be thus described with specific reference thereto, it will be appreciated that the invention may have usefulness in other fields and applications.

By way of background, wireless telecommunication networks, which are well known, allow mobile devices to communicate with each other and other networks, such as the Internet and the Public Switched Telephone Network (PSTN).

In general, the Universal Mobile Telecommunication System (UMTS) is a third generation mobile communications system that has evolved from the Global System for Mobile communication (GSM). The UMTS is intended to provide various mobile communication services by combining a UMTS Terrestrial Radio Access Network (UTRAN) with a Circuit-Switched (CS) Core Network (CN) based on the GSM.

The specification of the UMTS is currently being developed by a standardization group called the Third Generation Partnership Project (3GPP). In the 3GPP specifications, a Mobile Switching Center/Visitor Location Resister (MSC/VLR), which is a core network node belonging to a circuit switched region, is divided into Mobile Switching Center (MSC) servers and Media Gateways (MGWs).

In particular, the 3GPP is currently developing new worldwide standards for the creation, delivery, and playback of multimedia over new, high-speed wireless networks. These standards will enable the free sharing of multimedia between a variety of devices, including cell phones, Personal Digital Assistants (PDAs), and notebook and desktop computers. 3GPP devices include, in addition to a voice communication interface, capability for communication of data and display of data, including video.

3GPP specifications mandate the use of a Media Gateway (MGW) in the bearer path for voice calls and Circuit Switched Data (CSD) calls in the circuit core network. The MGW receives packetized voice from the Radio Network Controller (RNC) via Iu User Plane Protocol (IuUP) framing. Packetized voice is the process of converting audio signals into digital packet format, transferring these packets through a packet network, reassembling these packets into their original data form, and then recreating the audio signals. The voice or CSD packets then traverse through the MGW on route toward the destination. It is existing art (and in the process of standardization in 3GPP) to use IETF standard protocols to carry voice and data between MGWs in the core network. In many cases, the MGW does nothing more than convert the type of packetization used for the voice and data, i.e., converting between IuUP framing and IETF framing formats, where no transcoding of voice to another format is necessary. The newly reframed packets are then sent on toward the destination, which can be another MGW, a RNC, an IP Multimedia Subsystem (IMS), and so on. Using a MGW solely for performing a reframing function is not efficient from a cost and voice quality perspective.

Accordingly, the present invention contemplates a new and improved method and system that resolves the above-referenced difficulties and others. More particularly, this invention devises a method and system for eliminating MGWs from the bearer path when they are not needed. This invention is only applicable to an MSC when originating or terminating a call for a wireless subscriber. The prior art describes means of bypassing MGWs at transit exchanges and handover anchors, but does not describe the case of MGW bypass when the MSC is controlling access to a subscriber device via a RAN. This invention achieves at least two purposes for network providers: reducing cost by using less equipment in the network and improving voice quality by reducing bearer delay.

SUMMARY OF THE INVENTION

3GPP standards specify the use of IP in transporting packetized voice signals between the RNC and the MGW in the MSC. These packets are encapsulated within IuUP framing. When these same packets are transported into the core network (e.g., inter-MSC traffic) through a media gateway, they are encapsulated within NbUP framing when controlled by the Bearer Independent Call Control (BICC) protocol. When the use of the Session Initiation Protocol (SIP) is standardized within 3GPP, these packets will be transported into the core network via standardized Internet Engineering Task Force (IETF) formats. Example IETF methods include AMR (IETF RFC 3267) and G.711 (IETF RFC 3551).

The ability to carry native 3GPP AMR voice samples and CSD within the core network for the bearer path between the subscriber and the peer party is existing art. This allows transcoding to be eliminated for mobile-to-mobile calls. It also allows transcoding to be pushed to the edges of the service provider's network for mobile-to-land calls. Note, however, that it is still necessary for a MGW to perform framing conversion between the IuUP format used between the MGW and the RNC, and the IETF format used within the core network. Besides additional Digital Signal Processor (DSP) and packet network resources used to convert IuCS to IETF frames, additional delays are introduced resulting in higher costs when a CN MGW is in the bearer path.

The next step, and the subject of this invention, is the ability to limit the need for the MGW between the RNC and the core network. Instead of using the IuUP framing protocol at the bearer interface to the RNC according to the current 3GPP standard, this invention uses standardized IETF framing formats, such as IETF RFC 3267 (AMR—Adaptive Multi-Rate) and IETF RFC 4040 (Clearmode for CSD). This avoids the need to insert a MGW context only for the purpose of framing conversion. This invention also provides an optimization in the bearer path from the RNC to the peer party, thus avoiding the need for any MGW in the path for basic calls. With this optimization, the usage of DSP and packet resources and the number of MGW chassis, as well as bearer path delay, are all reduced.

Thus, methods and systems are provided for bypassing media gateways at MSCs that control radio access to user equipment in wireless networks.

In one aspect of the invention, a method of processing calls in a wireless telecommunications network is provided. The method comprises: the originating or terminating MSC receiving a call attempt from a calling party to a called party; determining whether an MGW is necessary at the MSC to begin to process the call; setting up a call bearer path between the calling party and the called party via a Radio Network Controller (RNC) controlled by the MSC and via an MGW at the MSC only if necessary to process the call; receiving a call event at the MSC; determining whether an MGW at the MSC is necessary to process the call event; and inserting or removing an MGW at the MSC depending on the requirements of the call event.

In another aspect of the invention, a method of processing calls in a wireless telecommunications network whereby an originating or terminating Mobile Switching Center (MSC) does not allocate a Media Gateway (MGW) resource at the beginning of a call. The method comprises: performing initial bearer negotiation with media capability information but without media connection information until media capability negotiation is complete; and determining that no condition exists requiring the inclusion of a MGW resource. Optionally, the method may further comprise including media connection information in subsequent bearer negotiation messages that does not reference any MGW resource.

In yet another aspect of the invention, a system for processing calls in a wireless telecommunications network is provided. The system comprises: means for receiving a call attempt from a calling party to a called party at an originating or terminating MSC; means for determining whether an MGW is necessary at the MSC to begin to process the call; means for setting up a call bearer path between the calling party and the called party via a Radio Network Controller (RNC) controlled by the MSC and via an MGW at the MSC only if necessary to process the call; receiving a call event at the MSC; determining whether a MGW at the MSC is necessary to process the call event; and inserting or removing an MGW at the MSC depending on the requirements of the call event.

In yet another aspect of the invention, a system for processing calls in a wireless telecommunications network whereby an originating or terminating Mobile Switching Center (MSC) does not allocate a Media Gateway (MGW) resource at the beginning of a call is provided. The system comprises: means for performing initial bearer negotiation with media capability information but without media connection information until media capability negotiation is complete; and means for determining that no condition exists requiring the inclusion of a MGW resource. Optionally, the system may further comprise means for including media connection information in subsequent bearer negotiation messages that does not reference any MGW resource.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION

Figure 1:
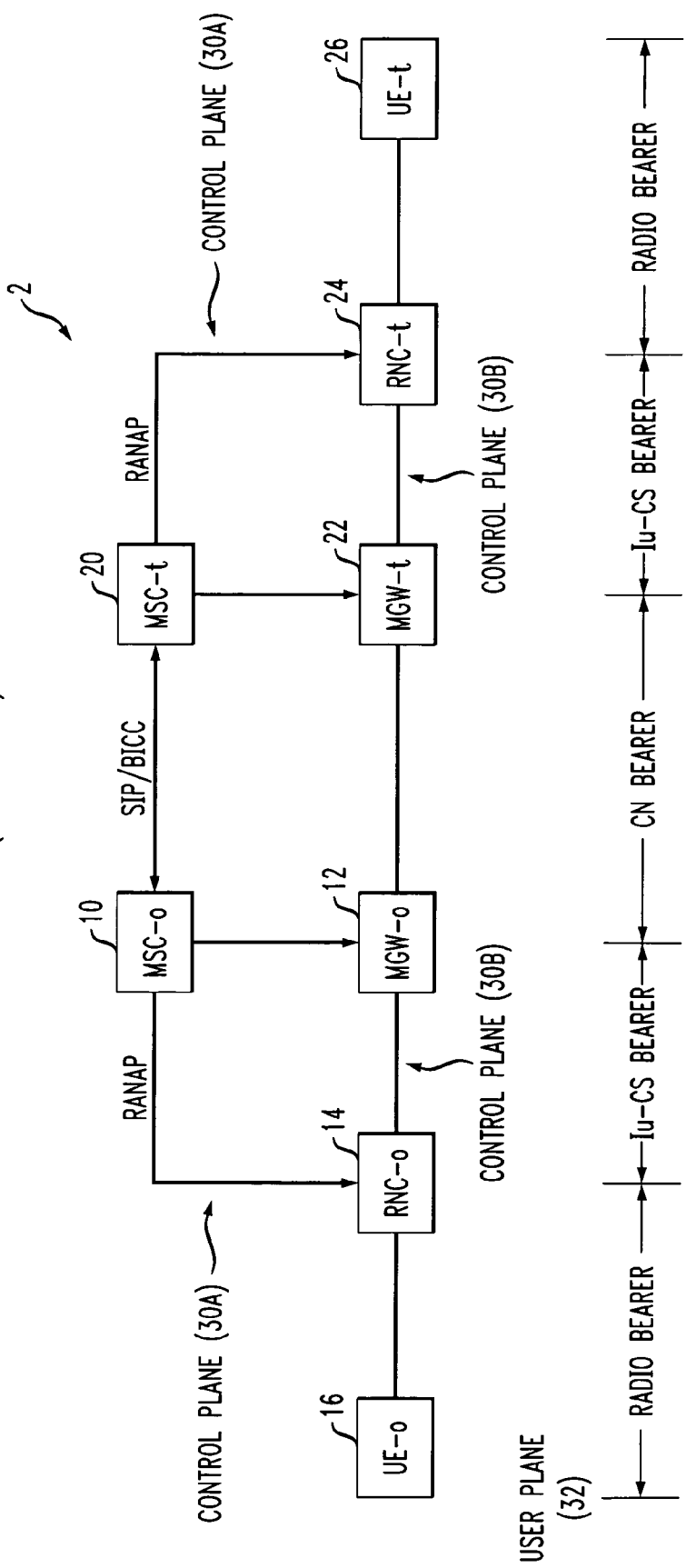
FIG. 1 is a schematic view illustrating an exemplary construction of a typical Universal Mobile Telecommunication System described in the 3GPP specifications.

Referring now to the drawings, which are for purposes of illustrating the exemplary embodiments only and not for purposes of limiting the claimed subject matter, FIG. 1 provides a view of a system into which the presently described embodiments may be incorporated. As shown generally, FIG. 1 is a view illustrating an exemplary structure of a UMTS 2 as described in the 3GPP specifications. In the drawings, like reference numerals have been used throughout to designate identical elements.

The MSC server 10 on the originating side of the UMTS 2 is connected to a MGW 12 via an Mc interface. The originating MGW 12 connects to other media gateways via an Nb interface. The originating MSC server 10 and the originating MGW 12 are connected to a Universal Mobile Telecommunications System Radio Access Network (UTRAN) via an Iu interface. The originating MSC 10 and the originating MGW 12 may be connected to a Public Switched Telephone Network (PSTN) as well (not shown in FIG. 1). Here, the UTRAN includes a Radio Network Controller (RNC) 14 and cell sites (Node Bs) (not shown in FIG. 1). The user terminal (or User Equipment: UE) is shown as 16. The originating MSC server 10 uses MEGACO/ITU H.248 as the protocol for controlling the originating MGW 12. The Mc, Nb, and Iu interfaces are defined in current 3GPP specifications.

Similarly, the MSC server 20 of the terminating side is connected to a MGW 22 via an Mc interface. The terminating MSC server 20 and the terminating MGW 22 are connected to a UTRAN via an Iu interface. The terminating MSC 20 and the terminating MGW 22 may be connected to a PSTN as well. Here, the UTRAN includes a RNC 24 and cell sites (Node Bs) (not shown in FIG. 1). The user terminal (or UE) is shown as 26. The terminating MSC server 20 uses MEGACO/ITU H.248 as the protocol for controlling the terminating MGW 22. It is to be understood, however, that additional network components may be present, including intermediate nodes (e.g., tandem exchanges, Gateway MSCs).

The MSC servers 10 and 20 are connected via an Nc interface, while the MGWs 12 and 22 are connected via an Nb interface. The MSC servers 10 and 20 are generally connected to each other using the Session Initiation Protocol (SIP) as defined by IETF RFC 3261 and associated extensions, to initiate interactive user sessions that involve the exchange of voice or data. Further, the MSC servers 10 and 20 control the MGWs 12 and 22 and include a Visitor Location Register (VLR) function to manage mobility of the terminals.

The MSC servers 10 and 20 may be connected to each other using Bearer Independent Call Control (BICC) rather than SIP. While this patent describes procedures using SIP, it also applies to BICC protocol or any other signaling protocol controlling packet bearers.

Further, the MSC servers 10 and 20 are connected to the RNCs 14 and 24, respectively, via a Radio Access Network Application Part (RANAP). RANAP represents a radio access network (RAN) signaling protocol that enables each MSC to control its UTRAN.

The MGWs 12 and 22 perform substantial media functions and bearer InterWorking (I/W) functions for the network. The MGWs 12 and 22 may additionally perform functions such as transcoding, echo cancellation, modem, bridging, Lawful Intercept delivery, and media packet framing interworking. MGWs 12 and 22 interwork between their CN bearer and their Iu bearer. The Iu bearers use IETF framing as an aspect of this invention. The RNCs 14 and 24 are connected to their respective UEs 16 and 26 via radio access bearers (and Node Bs not shown).

Two control planes (30A and 30B) exist in the standards for call establishment. The first control plane 30A conveys call information between the MSC server, the UTRAN and the UE. The second control plane 30B goes between the RNC and the MGW and/or MSC to establish the IP Iu bearer. A user plane 32 includes nodes 12, 14, 16, 22, 24, and 26 through which user traffic travels. Connections between the UEs 16 and 26 and the. RNCs 14 and 24, respectively, are established by means of radio access bearers (note that NodeB connections have been omitted for clarity), while connections between the RNCs 14 and 24 and the MGWs 12 and 22, respectively, are established through Iu bearers. Moreover, a connection between the MGWs 12 and 22 through a transit network is established by a core network (CN) bearer. An end-to-end connection between the UEs 16 and 26 may be established through the above-described bearers.

Referring to FIG. 1, when a call is established between the two UEs 16 and 26, each MGW (12 and 22) generates a logical entity referred to as a "context" for processing the corresponding call, and provides "terminations" for each context, which define each external connection to a context. The terminations on each context define the endpoints associated with Iu or CN bearers comprising an end-to-end connection between the two UEs 16 and 26. At this time, the MSC servers 10 and 20 must manage information regarding the bearer encoding (or codec) and network addresses and ports on each termination of the MGWs 12 and 22, respectively, to establish and maintain the end-to-end bearer path. When both the ingress and egress paths of a MGW use the same codec, transcoding is not necessary at that MGW. If no media gateway in the bearer path performs transcoding so that the UEs transparently exchange codec frames along the bearer path, this condition is known as Transcoder Free Operation (TrFO). If one of the endpoints is required to transcode, for example, when transcoding to PCM for a UE in the PSTN, but no other media gateway in the bearer path performs transcoding, the condition is known as Remote Transcoder Operation (RTO). TrFO or RTO is desired to minimize the number of transcoding stages performed in the network, thus minimizing the bearer delay and voice quality degradation introduced by each transcoding stage.

The establishment of TrFO or RTO in the network requires the end-to-end negotiation of codec capabilities throughout the network to maximize the number of bearer segments using the same codec. SIP uses the Session Description Protocol (SDP) defined in IETF RFC 4566 and the corresponding SDP offer/answer negotiation procedures defined in IETF RFC 3264 to perform the end-to-end codec negotiation.

The voice packets then traverse through the originating MGW 12 on route toward the destination, for example, the UE 26 on the terminating side. In many cases, the originating MGW 12 does nothing more than convert the type of packetization used for the voice, i.e., no transcoding of voice to another format is necessary. For example, the originating MGW 12 performs framing conversion between AMR/IuUP/RTP on the RNC side and AMR/RTP/IP on the CN side. The newly reframed packets are then sent on toward the destination (which can be another MGW, an RNC, an IMS system, and so on). Thus, the originating MGW 12 is in bearer paths even when it does not do transcoding, which is one of its main functions. Using the originating MGW 12 solely for a reframing function is not efficient from a cost and voice quality viewpoint.

The solution to this problem involves eliminating the MGWs 12 and/or 22 from the voice path when transcoding is not involved. To accomplish this goal, the RNC framing and vocoding is changed to be the same (or a subset of) that used in the CN. The RNC supports AMR/RTP and CSD bearers as used in the CN; thus, the MGWs 12 and 22 are not needed for framing conversion when carrying these bearers through the network. Of course, the MGW 12 or 22 may be added and subtracted from the bearer path as necessary. In this regard, the MGW is only utilized for services such as hard handover, multiparty, call forwarding, tones and announcements, and Customized Applications for Mobile network Enhanced Logic (CAMEL). The MGW is subsequently removed after that service completes (per FIG. 2). This solution applies equally as well to intra-MSC and inter-MSC calls.

IuCS is the circuit switched (CS) interface between the RNC and the MSC. This consists of several protocols and underlying ATM or IP hardware with an integrated management entity. With respect to the exemplary embodiment of the invention, the IuCS control plane protocol stack (3G TS 25.413) is not modified, i.e., it remains as RANAP/SCCP/M3UA/SCTP/IP/ETHERNET, while the IuCS user plane protocol stack changes to become RTP/UDP/IP/ETHERNET.

Figure 2:
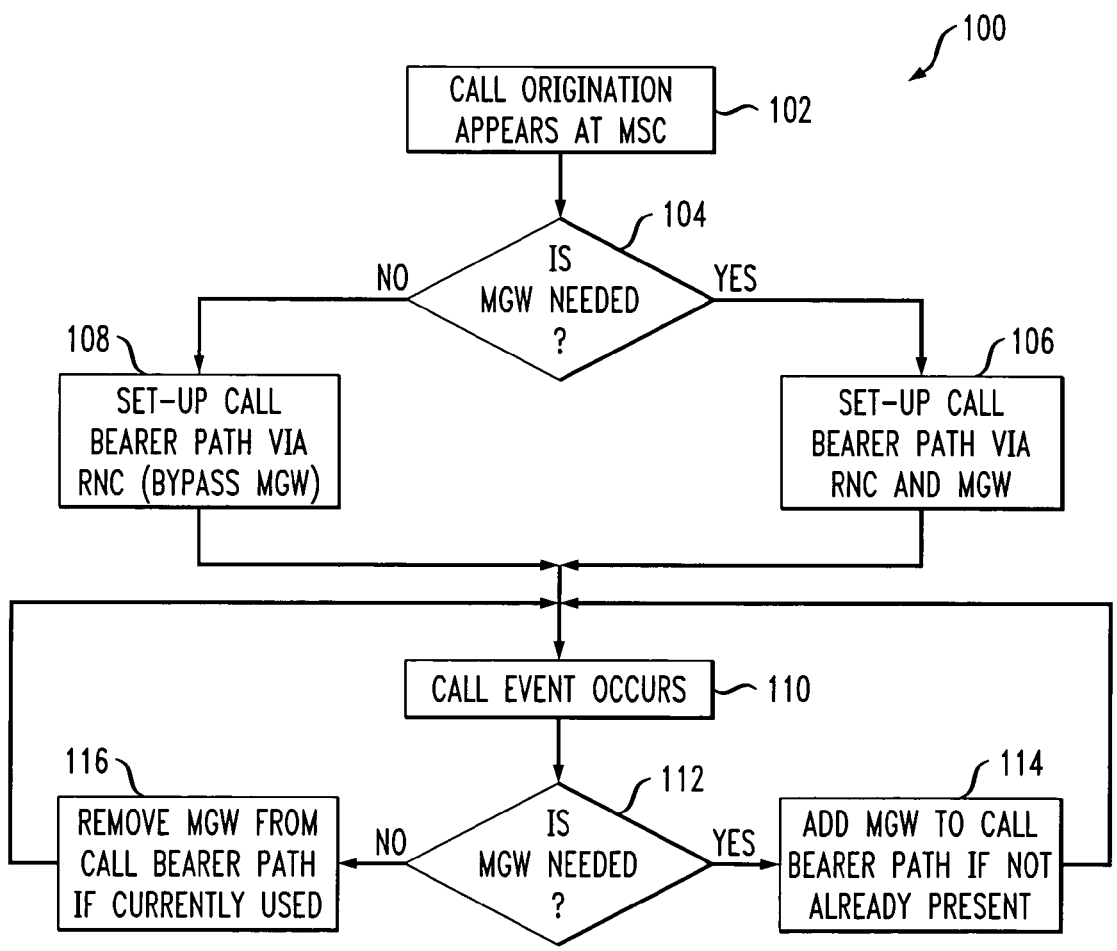
FIG. 2 is a flow chart of a call processing method for improving network efficiency according to aspects of the present invention.

The exemplary embodiment of a call processing method 100 for improving network efficiency is set forth in FIG. 2. The method 100 includes the following steps. Initially, a call from a calling party originates at the MSC 10 on the originating side or is delivered to the MSC 20 on the terminating side (102). Next, the MSC 10 or 20 determines if an MGW 12 or 22 is needed immediately (104). If so, the MGW is allocated and inserted as part of the initial bearer path establishment (106). Else, the call bearer path is set up directly via the RNC 14 or 24 (108). In this regard, the MGW 12 or 22 is bypassed.

Once the call bearer path has been set up, any number of call events may occur (110) at a node that allow the removal of the MGW 12 or 22 that is already in the call bearer path or that require the insertion of the MGW 12 or 22 into the call bearer path. Such call events may include call answer, tones and announcements, call conferencing (e.g. 3-way or 6-way calling), resuming to a 2-party call, wire tapping (CALEA), handover to another RNC or to a GSM system, services such as call forwarding and multi-party conferencing, etc. This applies to intra-MSC and inter-MSC calls.

Thus, when a call event occurs (110) at a node in the UMTS 2, a determination is made as to whether the originating MGW 12 (or the terminating MGW 22) is needed (112). If it is needed, then the appropriate MGW (12 or 22) is added to the call bearer path if it is not already present (114). When the MGW (12 or 22) is no longer needed, another call event occurs that allows it to be subtracted from the session. Of course, if the MGW (12 or 22) is not needed, then the triggering call event is processed without a MGW or the MGW is removed if currently being used (116).

Figure 3:
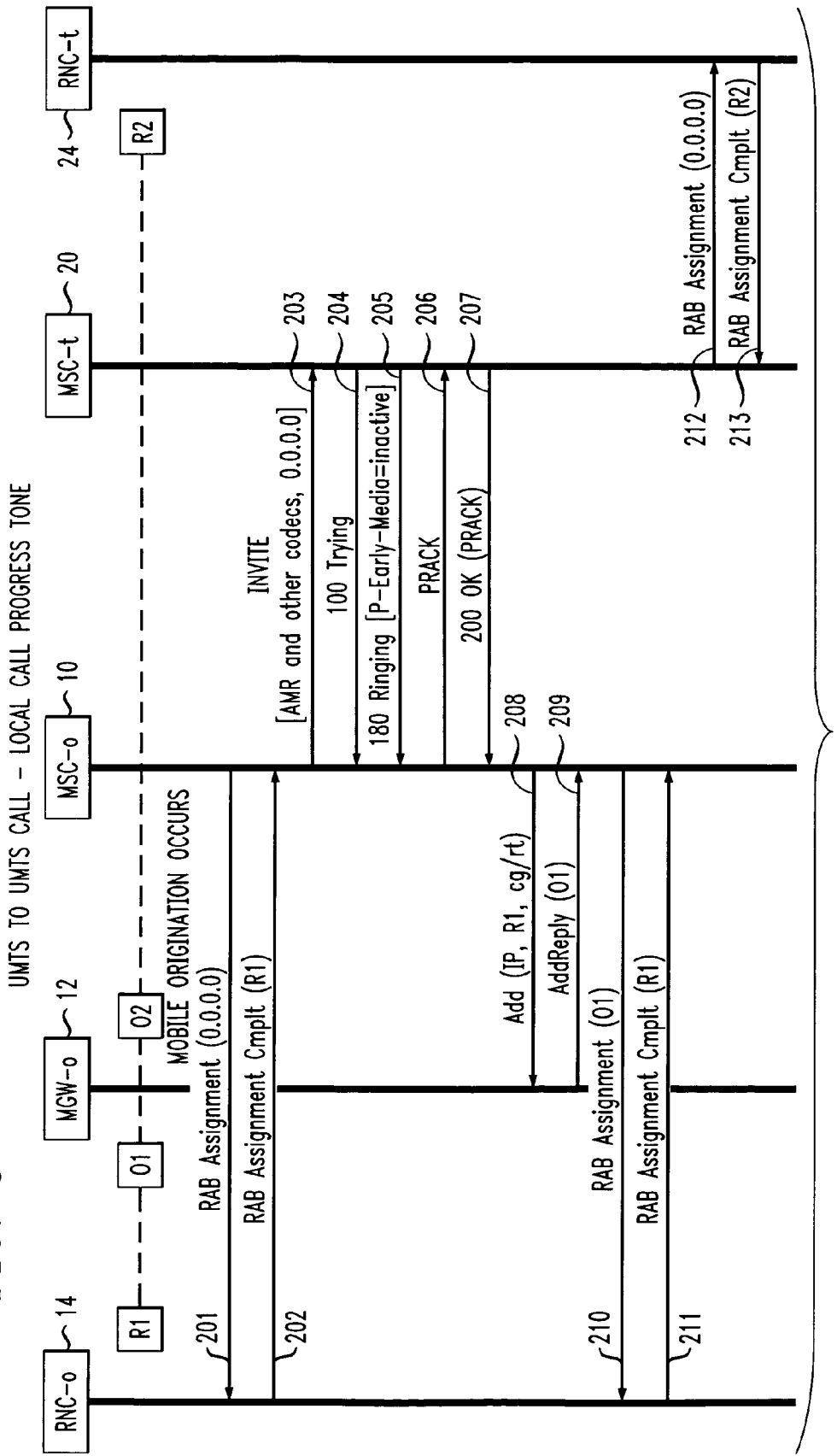
FIG. 3 is a message signaling diagram showing call establishment between two instances of CS user equipment (UE) when call progress information is inserted into the call bearer path to the calling party at a media gateway being controlled by the originating MSC in accordance with aspects of the present invention.
Figure 3:
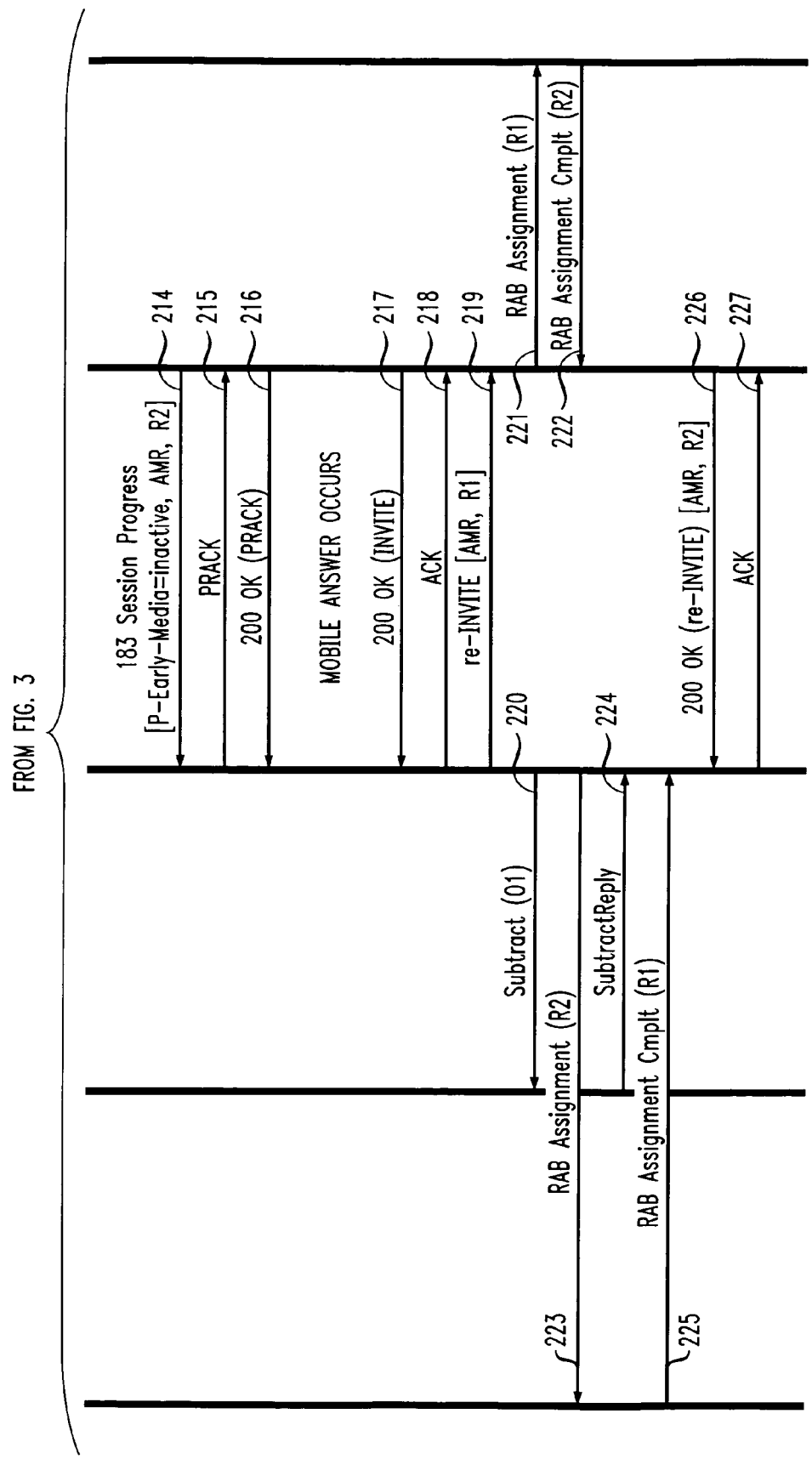
Figure 4:
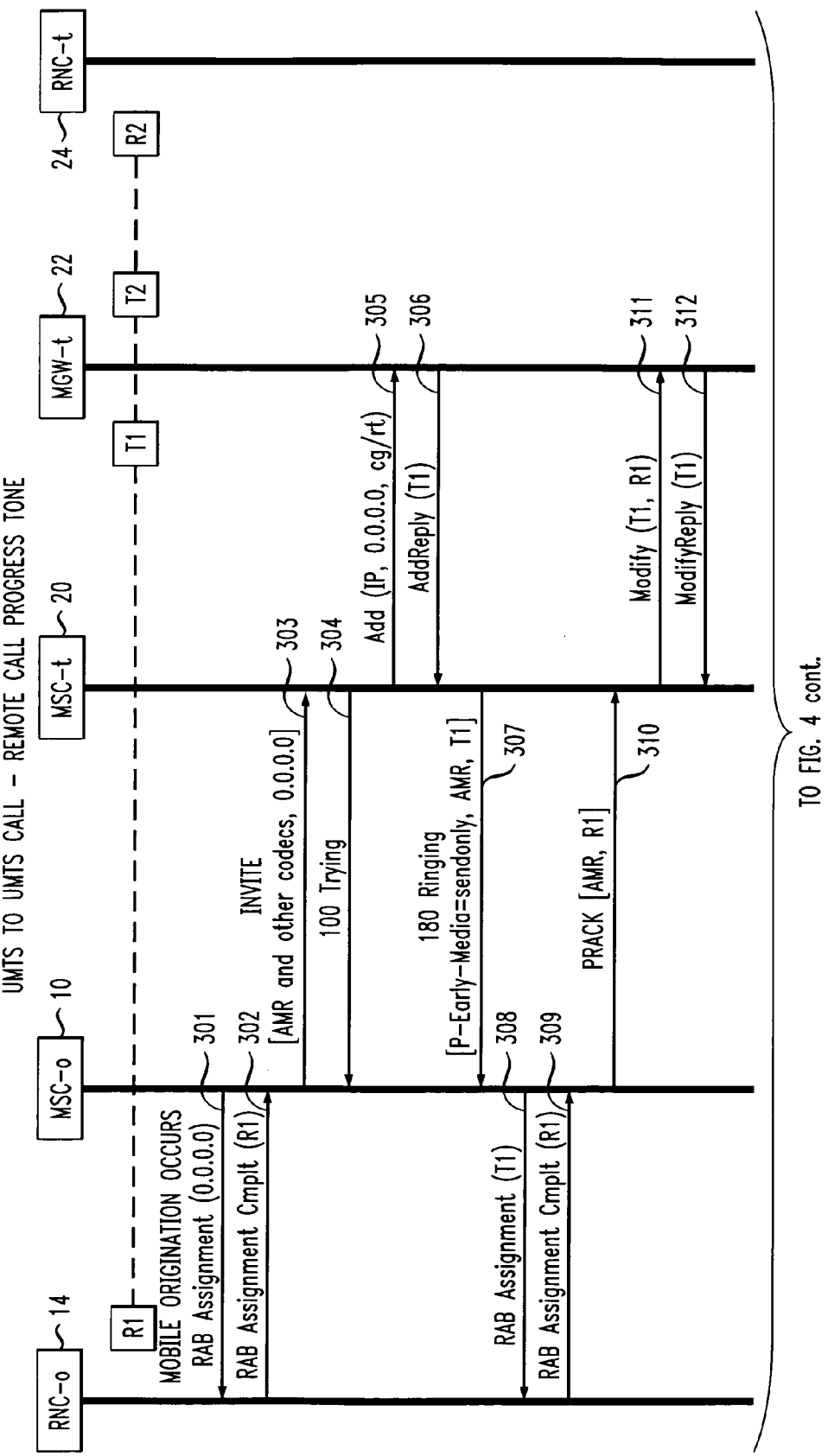
FIG. 4 is a message signaling diagram showing call establishment between two instances of CS user equipment (UE) when call progress information is inserted into the call bearer path to the calling party at a media gateway being controlled by the terminating MSC in accordance with aspects of the present invention.
Figure 4:
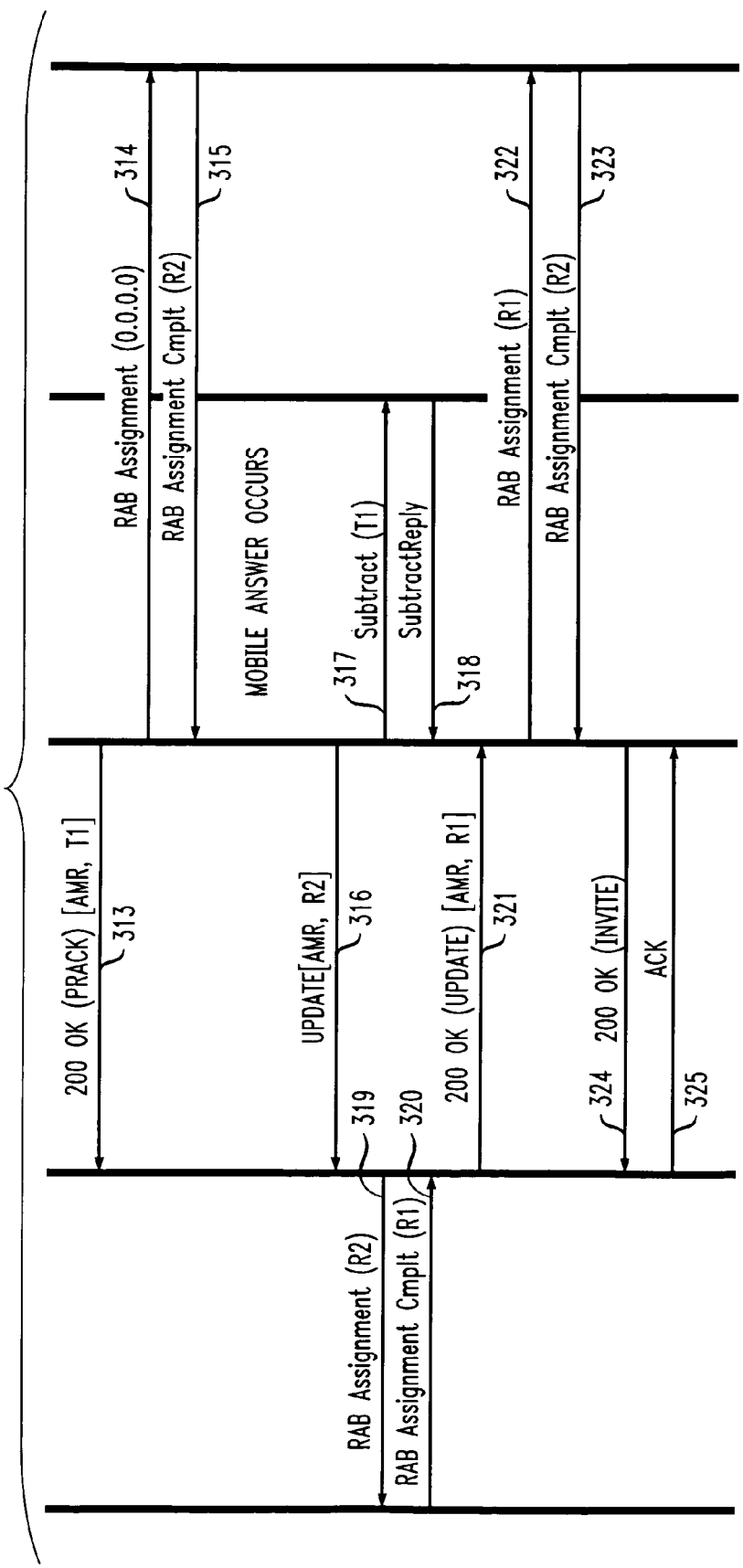

To further explain the operation of the present invention, two message signaling diagrams are presented in FIGS. 3 and 4. The following two scenarios in FIGS. 3 and 4 illustrate two common end-to-end call scenarios and possible methods for removing and inserting CN MGWs on an as-needed basis within the scenarios. FIGS. 3 and 4 show call scenarios in which either the originating MSC or the terminating MSC, respectively, generates in-band call progress information towards the calling party. These figures show the establishment of the originating radio access bearer before the establishment of the core network (CN) bearer and establishment of the terminating radio access bearer either before or after establishment of the CN bearer. Other variations exist for radio access bearer establishment and can be used to achieve the same result. For example, some implementations could choose to establish the CN bearer (via INVITE) before establishing the bearer with the originating RNC. These FIGS also show the sending of the 180 Ringing response as the first SIP provisional response message. Other variations exist in the SIP message sequence (e.g., sending the 183 Call Progress response as the first SIP provisional response message) that can achieve the same result in supporting SDP offer/answer negotiation procedures and progressing the call. Additionally, the current flows in this description convey a sequential flow of messages. Reasonable implementations could use parallel message exchange to optimize and reduce the time needed to complete the signaling. One example of the latter case is performing MGW "Add" commands in parallel with the response to the 180 Ringing response. SIP and 3GPP messaging provide the building blocks with which an MSC server brings MGWs in and out of the bearer path as needed. These scenarios and procedures also apply to other network types such as CDMA.

FIG. 3 shows a message signaling diagram when a network subscriber desires to establish a session with another network participant and the call establishment signaling in the network determines that the originating MSC is to provide call progress information to the calling party. The procedure begins with a mobile origination triggered by a message from the UE 16 that is not shown in FIG. 3. After a Setup Message is received from an originating UE, the originating MSC 10 requests media resources to be allocated at the originating RNC 14. Since the peer party IP address is not known at this point, the originating MSC 10 sets the IP address to 0.0.0.0 in the RAB assignment message (201). The originating RNC 14 responds to the RAB Assignment by establishing the radio access bearer and returning an RAB Assignment Complete message (202) to the originating MSC 10 with the IP address/port (R1) assigned at the RNC 14 for the Iu bearer connection. While a radio access bearer assignment message exchange has occurred, the Iu bearer is not yet established at this point because the originating RNC 14 does not have the IP address/port of the Iu or CN bearer endpoint.

The call setup is then continued from the originating MSC 10 to the terminating MSC 20. An INVITE request (203) is sent from the originating MSC 10 to the terminating MSC 20 with a list of supported codecs and CN bearer connection information to the remote end. It is desirable to prevent the flow of early media before all necessary resources have been allocated in the bearer path. The method shown in the flow to accomplish this is the use of the unspecified address of 0.0.0.0 for the originating IP address. Alternative methods, which are not illustrated in the flow, such as the use of SIP preconditions procedures (per IETF RFC 3312) or a separate media line for early media, are also possible. The terminating MSC 20 responds by sending a 100 Trying response (204). The terminating MSC 20 indicates that the called party's terminal device or phone is ringing by sending a 180 Ringing response (205) to the originating MSC 10. The coding of the P-Early-Media header with the "inactive" parameter in this message indicates that the terminating MSC 20 is not providing call progress tones to the calling party and that it expects the originating MSC 10 to provide a ringback tone to the calling party. The ringback is a signaling tone indicating that a called party is being alerted. In parallel, the terminating MSC 20 initiates paging and authentication of the called mobile (which is not shown in the call flows).

The originating MSC determines that it needs to insert a MGW in the bearer path to provide the ringback call progress tone to the originator as indicated by the 180 Ringing response (205) to the initial INVITE request. The originating MSC does the following in parallel: responds to the 180 Ringing response with a PRACK request (206) (which supports a reliable exchange of the 180 Ringing provisional response per IETF RFC 3262), and requests an IP address/port assignment from MGW 12 by sending a H.248 Add command (208) to MGW 12. The Add command includes the codec selected for the UE 16 during the RAB assignment procedure (201, 202) and the ringback call progress tone indicator (cg/rt) to be played to the originating UE 16. The MGW 12 responds with the IP address/port (O1) in the AddReply message (209).

Next, the originating MSC 10 completes the establishment of the Iu bearer connection between the allocated originating MGW 12 and the originating RNC 14. It does this by sending an RAB assignment message (210) containing the MGW IP address/port (O1) to the originating RNC 14. The RNC 14 confirms the RAB Assignment message by returning an RAB assignment complete message (211) containing the same RNC 14 IP address/port (R1).

Upon receiving the PRACK request (206) from the originating MSC 10, the terminating MSC 20 responds with a 200 OK (PRACK) response (207) to complete the SIP PRACK sequence.

After the terminating MSC 20 receives a paging response from UE 26, it allocates media resources on the terminating RNC 24. It forwards a RAB Assignment message (212) to the terminating RNC 24 with a remote IP address set to 0.0.0.0 to establish the terminating radio access bearer. In response, the terminating RNC 24 sends an RAB Assignment Complete message (213) to the terminating MSC 20 with the terminating RNC IP address/port (R2). The terminating MSC 20 sets up the terminating Iu connection without the remote IP address/port since it does not yet have a valid IP address/port of the originating side. The terminating MSC 20 then communicates the terminating RNC 24 media information to the originating MSC 10 by sending a 183 Session Progress response (214) to the originating MSC 10. The 183 Session Progress response includes the selected codec (e.g., AMR) and the IP address/port of the terminating RNC 14 (R2). The originating MSC 10 responds with another PRACK request (215). The terminating MSC 20 responds with a 200 OK (PRACK) response (216) to complete the SIP PRACK sequence. The originating MSC saves the remote IP address/port (R2) and codec received in the 183 Session Progress response for future use.

When the mobile answers, the terminating MSC 20 sends a 200 OK (INVITE) response (217) to the originating MSC 10, which responds with an ACK request (218).

The initial codec negotiation is completed, but an end-to-end media path has not yet been established. Furthermore, the call answer call event requires the cessation of ringback to the calling party, making the tone generation function of MGW 12 unnecessary. To fully establish an end-to-end media path, the originating MSC (10) sends a re-INVITE request (219) with the preferred Codec (e.g., AMR) received in step 214. It also includes the RNC 12 IP address/port (R1) in the re-INVITE request.

In this example, since a common codec is negotiated between the radio access bearer connection and the core network bearer path and the framing protocol is also the same (RFC 3267) between these two interfaces, neither codec transcoding nor framing conversion is necessary. Therefore, the originating MGW 12 is no longer needed and the originating MSC 10 can remove it from the call bearer path. To remove the originating MGW 12 from the bearer path, the originating MSC 10 sends a Subtract message (220) to the originating MGW 12 (220), which responds with a SubtractReply message (224). In parallel, the originating MSC 10 assumes that the remote CN bearer address/port (R2) will not change and sends an RAB assignment message (223) to the originating RNC 14 containing the terminating RNC IP address/port (R2). The originating RNC 14 responds with an RAB Assignment Complete message (225). If the remote CN bearer address/port returned in the subsequent 200 OK response (226) is not the assumed value (R2) then the originating MSC 10 can update the originating RNC 14 with another RAB assignment message (not shown).

When the re-INVITE request is received at the terminating MSC 20, the terminating MSC 20 sends an RAB assignment message to the terminating RNC 24 (221) with the IP address/port of the originating RNC (R1) received in the re-INVITE request, thus connecting the bearer path from RNC 12 to RNC 14. RNC 14 confirms receipt by returning an RAB Assignment Complete message (222).

Finally, the terminating MSC 20 sends a 200 OK (re-INVITE) response (226) to the originating MSC 10 with the IP address/port of the terminating RNC (R2), and the originating MSC 10 responds with an ACK request (227). The media now flows between the RNC 14 and RNC 24 without any intervening MGWs in the path after call answer.

It was shown in FIG. 3 that a media gateway may be necessary during call establishment in order to provide the ringing call progress tone. However, one option to optimize this method even more is that the RNC could be instructed to provide the ringback call progress tone. In this way, the initial call setup does not use a MGW. Additionally, the RNC could support and be instructed to play common announcements such as when the terminating party does not answer or is busy. The additional signaling required for the RNC to provide call progress tones is not shown.

If at any time a call event occurs at either MSC 10 or MSC 20 for which it would be desirable to insert or remove a local MGW, the MSC can initiate a standard re-INVITE transaction by sending the re-INVITE request to its peer MSC. The re-INVITE request will include SDP with codec and address information for the desired local bearer configuration (with or without the local MGW). This is a standard mid-call SDP offer/answer scenario so no figure is included to describe the message flow.

FIG. 4 represents a message signaling diagram when the call establishment signaling in the network determines that the terminating MSC is to provide the call progress information to the calling party. The procedure begins with a mobile origination triggered by a message from the UE 16 that is not shown in FIG. 4. The initial message flows for FIG. 4 are identical to FIG. 3 through the initial INVITE request. After a Setup message is received from an originating UE, an RAB assignment is sent from the originating MSC 10 to the originating RNC 14 (301) with the remote IP address set to 0.0.0.0 to establish the radio access bearer. The originating RNC 14 responds by sending an RAB Assignment Complete message (302) with the IP address/port R1 assigned at the RNC to be used for this session. An INVITE request (303) is then sent from the originating MSC 10 to the terminating MSC 20 with the codec list and IP address set to 0.0.0.0.

When the terminating MSC 20 receives the INVITE request, it responds with a 100 Trying response (304). Also, the terminating MSC 20, because it determines that it will provide the call progress tone, needs to insert a MGW in the media path to do so. Terminating MSC 20 sends an Add request (305) with the remote IP address/port received in the INVITE request, the selected codec and the ringback call progress tone indicator (cg/rt) to the terminating MGW 22, though the call progress media can not flow until the bearer path is fully established with an exchange of valid address information. The selected codec is usually the first codec in the offered list, if supported by the terminating MGW 22, to avoid any transcoding at the originating MGW 12. The terminating MGW 22 responds with an AddReply message (306) including the IP address/port (T1) assigned by the MGW 22. The terminating MSC 20 then sends a 180 Ringing response (307) to the originating MSC 10 with the terminating MGW IP address/port (T1) and selected codec (e.g., AMR). It also includes the P-Early-Media header coded with "sendonly" indicating that the terminating MSC 20 is providing the call progress tone. In parallel, the terminating MSC 20 initiates paging and authentication of the called mobile (which is not shown in the call flows).

The originating MSC 10 needs to establish the bearer path between RNC 14 and the remote network endpoint (MGW 22) and therefore sends an RAB assignment (308) to the originating RNC 14 with remote IP address/port set to T1. RNC 14 returns an RAB Assignment Complete message (309) to the originating MSC 10. The originating MSC 10 sends a PRACK request (310) to the terminating MSC 20 with IP address/port of originating RNC 14 (R1) and the selected codec.

The terminating MSC 20 then sends a H.248 Modify message (311) to the terminating MGW 22 with remote IP address/port of R1. MGW 22 responds with a ModifyReply message (312). In parallel with 311 the terminating MSC 20 sends a 200 OK (PRACK) response (313) to the originating MSC 10. At this point, the bearer path is connected between the originating RNC 14 and the terminating MGW 22 to provide call progress tone to the originating UE 16 using the selected codec (e.g., AMR). Therefore, in this scenario no transcoding is needed so far.

Upon receiving a page response message (not shown) from the terminating UE 26, the terminating MSC 20 establishes the radio access bearer connection between the terminating RNC 24 and the terminating UE 26. (The page response provides an indication to the terminating MSC which RNC to use for the call.) MSC 20 sends an RAB Assignment message (314) with an unspecified address (0.0.0.0) to the terminating RNC 24 to prevent any backward media flow from the terminating RNC 24. The terminating RNC 24 responds with an RAB Assignment Complete message (315) including the RNC IP address/port R2 to be used for this call.

When the terminating UE 26 answers, the terminating MSC 20 establishes the bearer path directly between the originating and terminating RNCs by sending an UPDATE request (316) to the originating MSC 10 with the RNC 24 IP address/port R2 and the selected codec (e.g., AMR).

Because no transcoding is required (as AMR was negotiated as a common codec) and the framing protocol (RFC 3267) is the same on the originating RNC 14 and on the terminating RNC 24 it is possible to remove all MGWs from the bearer path between the originating RNC 14 and the terminating RNC 24. Since the call progress tone is no longer needed at this point, the terminating MGW 22 may now be removed. The terminating MSC 20 sends a Subtract message (317) to the terminating MGW 22, which responds with a SubtractReply message (318) and removes itself from the bearer path.

Upon receiving the UPDATE request, the originating MSC 10 sends an RAB Assignment message (319) with the IP address/port R2 to the originating RNC 14, which responds with an RAB Assignment Complete message (320) with R1 as the IP address/port to use on RNC 14. The originating MSC 10 then sends a 200 OK (UPDATE) response (321) to the terminating MSC 20 with the IP address/port of RNC 14 (R1).

The terminating MSC 20 then sends an RAB Assignment message (322) to the terminating RNC 24 with the far end IP address/port R1. The terminating RNC 24 responds with an RAB Assignment Complete message (323). This completes the establishment of the end-to-end bearer path. The terminating MSC 20 sends a 200 OK (INVITE) response (324) to the originating MSC 10, which responds with an ACK request (325) to complete call setup. At this point media flows directly between RNC1 and RNC 2. Since no transcoding is required, a MGW is not needed in the path.

As in the scenario of FIG. 3, if at any time a call event occurs at either MSC 10 or MSC 20 for which it would be desirable to insert or remove a local MGW, the MSC can initiate a standard re-INVITE transaction by sending the re-INVITE request to its peer MSC. The re-INVITE request will include SDP with codec and address information for the desired local bearer configuration (with or without the local MGW). This is a standard mid-call SDP offer/answer scenario so no figure is included to describe the message flow.

This invention does not apply to intermediate MSCs and MSCs that interface to other networks (e.g. tandems, Gateway MSCs) since they do not involve a radio access network. Insertion and removal of MGWs at call setup and as the result of call events at these nodes (not shown in any figures) can be realized using SIP third party call control procedures as described in prior art.

The detailed description presented above is represented largely in terms of processes and symbolic representations of operations performed by conventional computer components, including a central processing unit (CPU), memory storage devices for the CPU, and connected display devices. These operations include the manipulation of data bits by the CPU, and the maintenance of these bits within data structures that reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of processing calls in a wireless telecommunications network, the method comprising:
   receiving a call from a calling party to a called party at a Mobile Switching Center (MSC);
   determining whether a Media Gateway (MGW) is necessary at the MSC to begin to process the call;
   setting up a call bearer path between the calling party and the called party via a Radio Network Controller (RNC) controlled by the MSC and via an MGW at the MSC only if necessary to process the call, wherein the framing on a path between the RNC and the MGW is selected to be the same as the framing on a path from the MGW towards the remainder of the network;
   after the call has been set up, receiving a call event at the MSC while the call is in process, wherein the call event triggers a change in the current state of the call;
   determining whether an MGW at the MSC is necessary to process the call event; and
   inserting or removing an MGW at the MSC during the call depending on the requirements of the call event.

2. The method defined in claim 1, wherein the wireless telecommunications network comprises a Universal Mobile Telecommunication System (UMTS).

3. The method defined in claim 1, wherein the call event comprises call answer, a tone, an announcement, call conferencing, resuming to a 2-party call, wire tapping, handover to another RNC or to a GSM system, call forwarding, or multi-party conferencing.

4. A method of processing calls in a wireless telecommunications network whereby a Mobile Switching Center (MSC) does not
   allocate a Media Gateway (MGW) resource at the beginning of a call, the method comprising:
   performing initial bearer negotiation with media capability information but without media connection information until media capability negotiation is complete; and
   determining that no condition exists requiring the inclusion of an MGW resource;
   and further comprising: determining that no condition exists by identifying that no transcoding is required and a single framing protocol may be used, and that the originating MSC does not need to provide a service requiring an MGW, including providing generation of call progress tone, conference circuits, or CALEA, or the terminating MSC does not need to provide a service requiring an MGW, including providing generation of call progress tone.

5. The method defined in claim 4, further comprising including media connection information in subsequent bearer negotiation messages that does not reference any MGW resource.

6. The method defined in claim 4, wherein the originating MSC is the local MSC associated with the calling subscriber.

7. The method defined in claim 4, wherein the terminating MSC is the local MSC associated with the called subscriber.

8. The method defined in claim 4, wherein initial bearer negotiation is performed though the exchange of SDP information contained in SIP INVITE, PRACK, 18X or 200 OK signaling messages.

9. The method defined in claim 4, wherein media capability information comprises the codec information and associated parameters.

10. The method defined in claim 4, wherein media connection information comprises IP address and port.

11. The method defined in claim 4, wherein subsequent bearer negotiation is performed through the exchange of SDP information in (re)INVITE, UPDATE, PRACK, 200 OK SIP signaling messages.

12. A system for processing calls in a wireless telecommunications network, the system comprising at least one server operative to:
    receive a call from a calling party to a called party at a Mobile Switching Center (MSC);
    determine whether a Media Gateway (MGW) is necessary at the MSC to begin to process the call;
    set up a call bearer path between the calling party and the called party via a Radio Network Controller (RNC) controlled by the MSC and via an MGW at the MSC only if necessary to process the call;
    after the call has been set up, receive a call event at the MSC while the call is in process, wherein the call event triggers a change in the current state of the call;
    determine whether an MGW at the MSC is necessary to process the call event; and
    insert or remove an MGW at he MSC during the call depending on the requirements of the call event.

13. The system defined in claim 12, wherein the wireless telecommunications network comprises a Universal Mobile Telecommunication System (UMTS).

14. The system defined in claim 12, wherein the call event comprises call answer, a tone, an announcement, call conferencing, resuming to a 2-party call, wire tapping, handover to another RNC or to a GSM system, call forwarding, or multi-party conferencing.

15. A system for processing calls in a wireless telecommunications network whereby a Mobile Switching Center (MSC) does not allocate a Media Gateway (MGW) resource at the beginning of a call, the system comprising at least one server operative to:
    perform initial bearer negotiation with media capability information but without media connection information until media capability negotiation is complete;
    determine that no condition exists requiring the inclusion of an MGW resource, wherein the at least one server is further operative to:
    determine that no condition exists by identifying that no transcoding is required and a single framing protocol may be used, and that the originating MSC does not need to provide a service requiring an MGW, including providing generation of call progress tone, conference circuits, or CALEA, or the terminating MSC does not need to provide a service requiring a MGW, including providing generation of call progress tone.

16. The system defined in claim 15, wherein the at least one server is further operative to:
    include media connection information in subsequent bearer negotiation messages that does not reference any MGW resource.

17. The system defined in claim 15, wherein the originating MSC is the local MSC associated with the calling subscriber.

18. The system defined in claim 15, wherein the MSC comprises a terminating MSC that is the local MSC associated with the called subscriber.

19. The system defined in claim 15, wherein the at least one server is further operative to:
    perform initial bearer negotiation through the exchange of SDP information contained in SIP INVITE, PRACK, 18X or 200 OK signaling messages.

20. The system defined in claim 15, wherein media capability information comprises the codec information and associated parameters.

21. The system defined in claim 15, wherein media connection information comprises IP address and port.

22. The system defined in claim 15, wherein the at least one server is further operative to:
    perform subsequent bearer negotiation through the exchange of SDP information in (re)INVITE, UPDATE, PRACK, 200 OK SIP signaling messages.

* * * * *